United States Patent [19]

Zoino

[11] 4,212,379
[45] Jul. 15, 1980

[54] CONICAL CLUTCH

[76] Inventor: Hugo A. Zoino, 273 Parker St., Newark, N.J. 07104

[21] Appl. No.: 887,602

[22] Filed: Mar. 17, 1978

[51] Int. Cl.² ............................................. F16D 13/24
[52] U.S. Cl. ..................................... 192/66; 192/53 B; 192/70.15; 192/107 R
[58] Field of Search ............... 192/65, 52, 53 B, 53 F, 192/66, 107 R, 70.15

[56] References Cited
U.S. PATENT DOCUMENTS

| 533,602 | 2/1895 | Murphy | 192/53 B |
|---|---|---|---|
| 798,217 | 8/1905 | Schöppner | 192/52 |
| 1,657,265 | 1/1928 | Ludwig | 192/107 R X |
| 2,070,154 | 2/1937 | Carter | 192/52 X |
| 2,690,248 | 9/1954 | McDowall | 192/107 R X |
| 3,608,685 | 9/1971 | Childress | 192/65 X |
| 3,750,788 | 8/1973 | Heinemann | 192/107 R |

FOREIGN PATENT DOCUMENTS

| 113325 | 6/1941 | Australia | 192/66 |
|---|---|---|---|
| 1038981 | 10/1953 | France | 192/107 |

Primary Examiner—Rodney H. Bonck
Attorney, Agent, or Firm—Carella, Bain, Gilfillan & Rhodes

[57] ABSTRACT

A cone clutch wherein the inner cone includes at least one ridged engaging surface and a second ridged engaging surface is provided on the inner cone or the inner wall of the outer cone for retarding the final rate of clutch engagement.

14 Claims, 14 Drawing Figures

U.S. Patent Jul. 15, 1980 Sheet 1 of 2 4,212,379
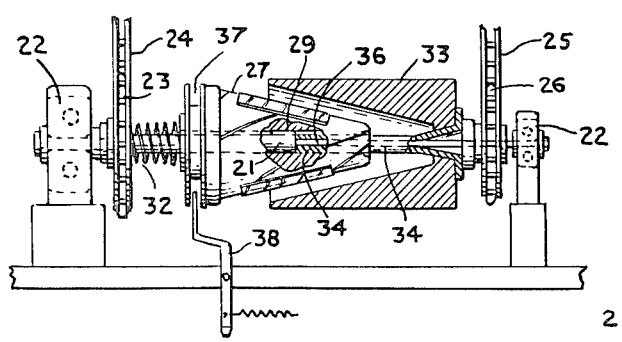
FIG. 1
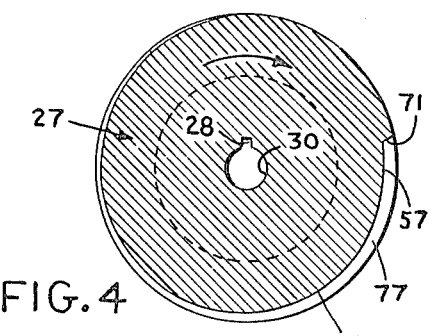
FIG. 4
FIG. 2
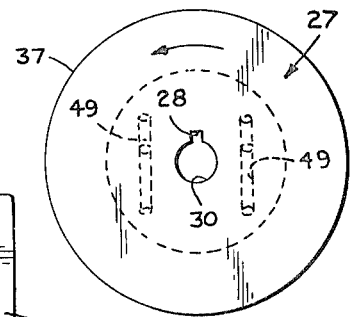
FIG. 6
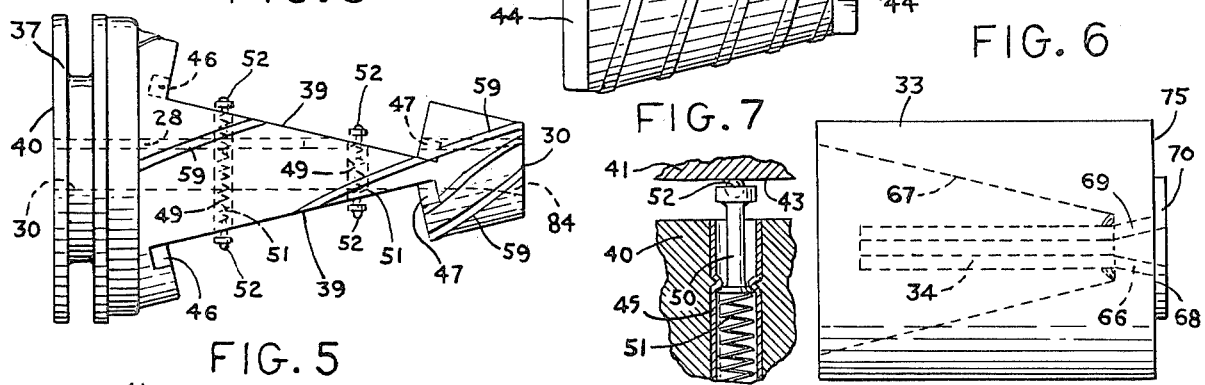
FIG. 3 FIG. 7 FIG. 10
FIG. 8
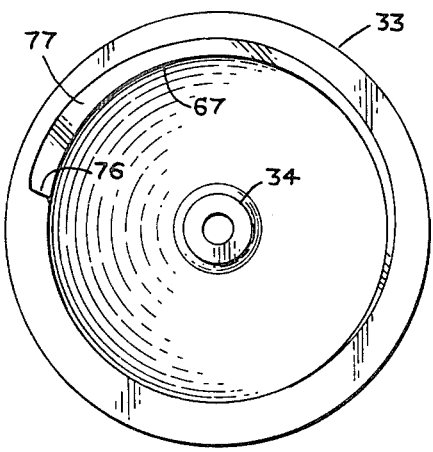
FIG. 5 FIG. 9
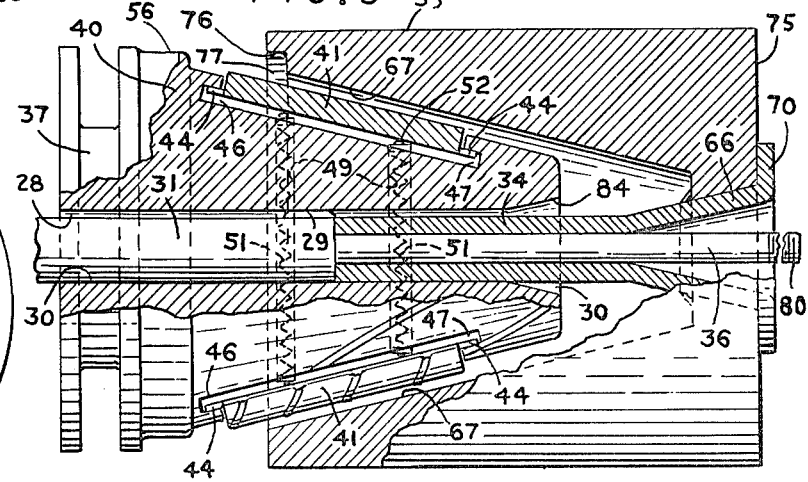
FIG. 11 FIG. 12

CONICAL CLUTCH

The present invention relates to a cone clutch wherein the engagement of the inner cone with the outer cone is so accomplished that the load is picked up at a gradually increasing rate which tapers off during the final stage of engagement.

The desirability of providing a gradual engagement of the driving and driven members of a clutch and to prevent the imparting of a sudden thrust or shock to the members with a resultant strain on the parts has long been recognized in the art. The problem just mentioned may be especially acute when a relatively heavy load is to be picked up. One prior art disclosure of general interest is U.S. Pat. No. 533,602 to W. A. Murphy dated Feb. 5, 1895.

In a cone clutch, the engagement of the inner cone with the outer cone takes place with a wedging action as the load is picked up incrementally until the engagement reaches its peak as the cones rotate steadily at the same rate of speed. In cases where the contemplated rate of speed is relatively high, e.g. 1,500 to 2,000 r.p.m., the final engagement of the cones compounds the problem of imparting a sudden thrust to the parts due to the sharply rising rate of engagement during that period.

An object of the invention is the provision of a cone clutch wherein the engagement between the inner cone and the outer cone is controlled to prevent strain on the parts during final engagement of the members.

Another object of the invention is the provision of a cone clutch wherein the engagement between the inner and outer cones increases incrementally at a first rate, and then increases at a lower rate during final engagement of the cones.

A further object of the invention is the provision of a high speed clutch wherein the clutch engagement is smoothly controlled throughout the engaging period.

Other objects and advantages of the invention will become apparent during further description of the invention.

According to the invention, there is provided a cone clutch comprising an inner cone having at least one ridged engaging surface, and a second ridged engaging surface on the inner cone or the inner wall of the outer cone for retarding the final rate of clutch engagement.

In one embodiment, there is provided a cone clutch comprising an inner cone and an outer cone wherein the inner cone is provided with at least one ridged engaging surface for engaging the outer cone at a first rate and a second ridged engaging surface for engaging the outer cone at a second rate. The first ridged engaging surface is designed to provide an initial engagement between the cones at a relatively rapid and gradually increasing rate and the second ridged engaging surface is designed to provide an engagement between the cones at a slower rate during the last stage of engagement so that the overall but still increasing engagement rate tapers off during that period. This softens the engagement and assures a smooth transition of power from the inner to the outer cone.

The first engaging surface may comprise one, two or a multiple of two thereof, e.g. 2,4,8,16, 32 etc. spring mounted plates whose outer periphery is of an arcuate shape. When two plates are used they assume opposite positions on the inner cone. The plates are provided at their surface with ridges which are angularly disposed with respect to the base of the inner cone and the clutch axis. Spring means normally project the outer periphery of the plates at a slight distance radially beyond the other portions of the inner cone surface. Those portions of the inner cone not occupied by the plates are provided at their surface with ridges which are also angularly disposed but at a different angle than the plate ridges. As the clutch is operated, the inner cone moves axially toward the outer cone and engagement begins as the ridges of the plates engage the inside conical wall of the outer cone and such engagement continues in this manner until the plates are fully depressed against the action of the spring means. During the last stage of engagement both angularly disposed ridged surfaces contribute to the overall engagement. The angularly disposed ridges on the fixed part of the inner cone tend to slow down the overall but still increasing rate of engagement. Means are provided for positively locking the cone members together as the final engagement is attained.

It should be pointed out that the primary engaging surface comprises the ridges of the arcuate plates. Further, a single arcuate plate may be employed. Additionally, the invention contemplates the provision of at least two arcuate plates whose center points form radii 180° apart.

In a second embodiment of the invention the inner cone is provided with arcuate plates as described. However, instead of providing the inner cone with additional ridges, the conical inside wall of the outer cone is provided with a helix shaped continuous ridge or thread or a series of ring-shaped ridges or threads. Such a construction produces a result similar to that described with respect to the first embodiment, that is, the helical ridge or ring-shaped ridges slow down the rate of engagement during the final stages of operation.

The invention structures and their mode of operation will be more fully understood and appreciated from the ensuing description when it is read in conjunction with the accompanying drawings wherein:

FIG. 1 is a schematic view of the invention;

FIG. 2 is a view of the shaft upon which the inner and outer cones are mounted;

FIG. 3 is a side view of the inner cone;

FIG. 4 is a view of the larger end of the inner cone taken along lines 4—4 of FIG. 3;

FIG. 5 is a view of the inner cone with the arcuate plates removed;

FIG. 6 is a view from the larger end of the inner cone;

FIG. 7 is a top view of an arcuate plate;

FIG. 8 is an end view of the arcuate plate;

FIG. 9 is an enlarged view of a compression spring device;

FIG. 10 is a side view of the outer cone;

FIG. 11 is a view from the larger end of the outer cone;

FIG. 12 is a broken away view, partly in section, of the inner cone inside the outer cone;

Figure 13:
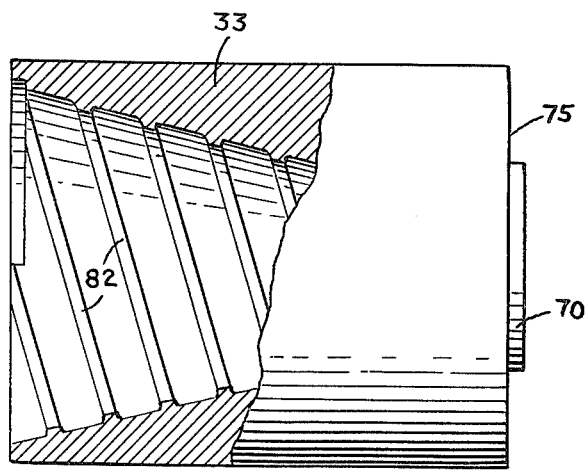
FIG. 13 is a second embodiment of the invention showing in section, the helical engaging surface of the outer cone.

Referring first to FIGS. 1 and 2, there is shown a shaft 21 whose end portions are suitably carried in bearing mounts 22. Near the left end of the shaft 21 a driving sprocket 23 is coupled to chain 24. The right end of the shaft attached to the outer driver cone 33 is attached to a driven sprocket 25 and may impart rotary motion to a chain 26.

An inner or driving cone 27 is mounted on the shaft 21 and includes a keyway 28 extending along a portion of a central opening 30 and engageable by a Woodruff key 29 mounted on the enlarged portion 31 of the shaft 21. This construction, of course, enables motion of the cone to the right under the impetus of an actuating spring 32 when released for clutch engagement and in the opposite direction when the clutch is disengaged.

Coaxially and freely rotatably mounted on the shaft 21 is the outer or driven cone 33 which includes an inner cylinder 34 adapted to receive the reduced portion 36 of the shaft 21.

The inner cone 27, which is preferably of hardened steel, will now be described with special reference to FIGS. 3 to 9. The larger end of the inner cone includes integral grooved member 37 engageable by an operating lever 38. The inner cone 27 is provided with oppositely located cutout portions 39 which receive the arcuate plates 41. These plates have an arcuate outside surface 42 and an inner flat surface 43 as shown in FIG. 8. Protruding from opposite ends of each plate are shoulders 44 which may be slid into the grooves 46 formed on the inner cone and extend normal to the axis of the cone. The grooves are open at one end and closed at the opposite end. Thus, in FIG. 3 the lower plate 41 is inserted in a direction into the drawing through the open end of grooves 46 until it reaches the closed end while the other plate 41 is inserted into the grooves in the opposite direction. Four openings 49 extend completely through the main portion 40 of the cone 41 shown in FIG. 5. Each hole is adapted to receive an elongated casing 45 containing a compression spring 51 which normally urges oppositely arranged plungers 50 carrying ball bearings 52 outwardly to engage the flat sides 43 of the arcuate plates 41 in opposite radial directions so that the ridged surfaces of the plates are normally above the ridge surfaces on slanting portions 85 of the cone 27. At this time, the shoulders 44 are pressed radially outward against the portion of the grooves 46 furthest from the shaft axis.

The dimension of the grooves 46 and the shoulders 44 of the plates are such that the plates when inserted are permitted to move radially, as just described, and to move slightly back and forth in a direction parallel to the shaft. Also the dimensions permit a slight back and forth motion of the shoulders 44 in the respective grooves 46 in a direction normal to the direction of the axis of the cone. It may be mentioned at this time with reference to FIG. 8 that each arcuate plate 41 is tapered substantially to a point 53 at one side thereof while at the opposite side of the plate the pointed portion is removed so that a small vertically extending surface 54 remains. The purpose of these configurations will be explained in an ensuing portion of the description. In summation, it may be said that the plates with respect to the main portion 40 of the cone are permitted a limited three dimensional movement, i.e., radially, longitudinally with respect to the cone axis, and transversely with respect to the shaft.

An integral rim 56 of the inner cone 27 adjacent grooved member 37 is provided with a circularly disposed cutout portion 57 to enable a positive engagement of the inner cone 27 with the outer cone 33 as will be described later.

With reference to FIGS. 10 to 13 the outer cone 33, which may be of a milder steel, will now be described.

Figure 14:
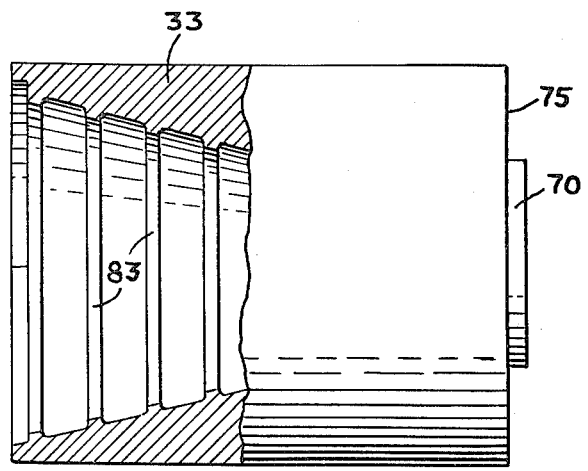
FIG. 14 is a variation of the second embodiment of the invention showing in section the ring-shaped engagement surface of the outer cone.

A flareshaped collar 66 is attached to cylinder 34 near its right end for example, by welding or by means of a bolt. The collar 66 in turn is attached to the inner wall 67 at the end 68 thereof, for example, by welding or bolting. To facilitate the connections, collar 66 may include a circular portion 69 engaging the cylinder and a flange 70 which is designed to contact the outer end wall 75 of the cone 33. See FIG. 14. The inside diameter of the cylinder 34 is slightly larger than the reduced portion 36 of the shaft and is in threaded engagement therewith as shown at 80. Any conventional attaching means may be used, for example, a bolt. In the embodiment being described, the inner wall 67 of the outer cone 33 is relatively smooth.

It will be seen that the arcuate plates 41 of the inner cone are provided with a ridged surface comprising a series of ridges or threads 58 disposed at a relatively low angle which may be 55° to 65°, with respect to the shaft axis, whereas, to provide a contrast, the outside regions of the main portion 40 of the inner cone are provided with a ridged surface comprising a series of ridges or threads 59 disposed at a relatively higher angle which may be 70° to 90°. There may be a progressive variation of the individual angular ridges of the main portion of the inner cone within the stated range. The ridges in a sense define a series of partial helices.

When the lever 38 is operated, the actuating spring 32 is freed to drive the inner cone 27 towards the outer cone 33. In FIG. 12, the inner cone is shown near the mid-point of its advancing stroke. Initially, the ridges 58 of the arcuate plates 41, which are at this time in their outmost positions due to the force exerted by the compression springs 51, engage the inner wall 68 of the outer cone 33 at first lightly and start to rotate the outer cone 33. As the inner cone 27 continues its advancement to engage the outer cone with increasing force such engagement builds up rapidly. The engagement may be likened to a screwing action as the threads 58 rotate. When the plates are fully depressed as the inner cone 27 advances, the top of threads 59 are in line with the top of the threads 58 and join in the inner wall engagement to provide an overall effect which tends to reduce the rising rate of engagement to soften the final stages of clutch engagement. As the cone completes engagement with the outer cone a positive lock is assured as an edge 71 of the circular cutout portion 57 of a rim 73 on the inner cone engages an edge 76 of the circular cutout portion 77 at the base end of the outer cone 33.

It is estimated that when the driving cone 27 is operated at a high speed, e.g. 3000 r.p.m. engagement may be completed in 2½ to 3 revolutions.

When the clutch is fully engaged, the plates 41, which are free to move slightly in a direction parallel to shaft 21 are pressing with their shoulders 44 at the left in FIG. 12 against the bottom portion of the two grooves 46 which lie toward the base of the inner cone 27. As the lever 38 is operated to disengage the clutch, the plates 41 tend to remain stationary for a moment so that the outer shoulders 44 at the right in FIG. 12 are now pressing against the bottom portion of the other two grooves 47 which lie toward the smaller end of the cone. In other words, there is a slight relative movement between the plates 41 and the main portion 40 of the inner cone. The relative movement tends to quickly free the inner cone from the outer cone.

Previously, attention has been called to the vertical edges 54 of the plates 41. See FIG. 8. It has been found that if edge 53 of plate 41 (FIG. 5) is sharp, as is the opposite edge at abutment 54, slight movement of plate 41 transverse to the axis of the shaft 21 in response to rotation and engagement of the inner and outer cones, would tend to cut the inner surface of the outer cone. Therefore, during final engagement of the cones, the vertical edges abutment edge 54 become wedged against the outer cone wall 57 precluding the described unwanted movement.

The working surface of the inner cone is dimensioned with respect to the working surface of the outer cone so that the extreme leading end thereof does not reach the end of wall 67 near the flared member 66. This will allow further penetration of the inner cone if some wear on the parts occurs after usage over a period of time. The length dimension of the working surface of the outer cone may be of the order of 6 inches, with the working surface of the inner cone being about 5 inches.

The central opening 30 of the inner cone 27 includes a flared end 84 which is adapted to nestle about the flared collar 66 of the outer cone during clutch engagement and contributes to the disengagement of the clutch.

In the second embodiment of the invention shown in FIGS. 15 and 16, the ridges 59 are removed from the inner cone 27 but the ridges 58 remain on plates 41. In FIG. 15, the inner wall 67 of the outer cone 33 is now provided with a ridged helix 82 at a different angle than the ridges 58 of the arcuate plates 41. This structure operates substantially in the same manner as the first embodiment to soften the final engagement of the clutch. Instead of a helix, a series of rings 83 may be provided along the inner wall 67 as shown in FIG. 16. During clutch operation, the ridges 58 of the arcuate plates 41 cut across and engage the ridged helix 82 or rings 83 as the case may be. In the final stages of engagement, with the arcuate plates 41 fully depressed, the increasing rate of engagement is reduced. This result is achieved as the helix 82 or rings 83 offer increasing resistance to the threads 58. While in both embodiments substantially rectangular threads or rings are shown other configurations may be used providing they do not cut into the inner wall 67 of the outer cone 33.

Various changes, alterations and substitutions may be made without departing from the spirit and scope of the invention.

What is claimed is:

1. A cone clutch comprising an inner cone and an outer cone, a shaft for supporting the cones, the inner cone being mounted for axial movement along the shaft, the inner cone being mounted for rotation with the shaft, and actuating means for moving the inner cone in one direction into engagement with the outer cone and for moving the inner cone in the opposite direction out of engagement with the outer cone, the inner cone being provided with at least one ridged surface comprising ridges disposed at predetermined angles, and said one ridged surface being interrupted by at least one radially movable plate having an arcuate outer periphery which includes ridges disposed at predetermined angles different from the first mentioned angles.

2. A cone clutch according to claim 1 wherein the inner wall of the outer cone is provided with a ridged surface.

3. A clutch according to claim 1 wherein spring means are provided for normally urging the plate radially outward so that the top of the ridges of the movable plate project beyond the top of the ridges of said one ridged surface, on operation, the outer cone being engaged by a combination of the two engaging surfaces during the last stage of clutch engagement.

4. A cone clutch comprising an inner cone and an outer cone, a shaft for supporting the cones, the inner cone being mounted for to and fro movement on the shaft, the inner cone being attached to and for rotation with the shaft, and actuating means for moving the inner cone into engagement with the outer cone and for moving the inner cone in the opposite direction for disengagement, the inner cone including a pair of oppositely disposed radially movable plates, each having an outer periphery which includes a ridged surface and the inner cone further including a fixed ridged surface, the ridges of the plates being disposed at different angles than fixed ridges, spring means for normally urging the plates radially outward so that the tops of the ridges of the first ridged surfaces project beyond the tops of the ridges of the fixed ridged surface, on operation, the outer cone being first engaged by the ridges of the engaging surfaces of the plates and then as each plate is substantially fully depressed against the action of the spring means, the outer cone being engaged by a combination of all engaging surfaces during the last stage of clutch engagement.

5. A cone clutch according to claim 4, wherein in the inner cone a main portion includes two sets of spaced grooves extending transverse to the cone axis, each plate having oppositely extending shoulders for engaging the grooves, the dimensions of the shoulders and the grooves being such that each plate is free to move slightly in a radial direction and in a direction parallel to the cone axis, and in a direction transverse to the cone axis.

6. A cone clutch according to claim 4, wherein in the inner cone a main portion includes two sets of spaced grooves extending transverse to the cone axis, each plate having oppositely extending shoulders for engaging the grooves, the dimensions of the shoulders and the grooves being such that each plate is free to move slightly in a radial direction and in a direction parallel to the cone axis, and in a direction transverse to the cone axis, the side of each plate at the leading edge with respect to the direction of the cone rotation including a vertical portion which inhibits transverse movement of the plate during final engagement.

7. A cone clutch according to claim 4 wherein the spring means comprises a plurality of spring devices extending through openings in a main portion of the inner cone and each including a compression spring and a pair of plungers at opposite sides of the spring each supporting a bearing which is pressed against a flat underside of one of the plates.

8. A cone clutch according to claim 4 wherein the inner cone is provided at its larger end with a rim having a circularly extending cut out portion, one end of the cut out portion terminating in an engaging edge, and the outer cone being provided at its larger end with a circularly extending cut out portion terminating in an engaging edge, the edges being disposed so that during final engagement of the two cones, the engaging edge of the inner cone moves against the engaging edge of the outer cone to achieve a positive engagement.

9. A cone clutch according to claim 4 wherein the outer cone includes a centrally located cylinder surrounding the shaft, a flared collar attached to the cylinder near the smaller end of the inner conical wall, the inner cone including a central opening for engaging the shaft which terminates in a flared portion complementary to the flared collar whereby during final engagement of the clutch the flared portion of the opening surrounds the flared collar.

10. A cone clutch comprising an inner cone and an outer cone, a shaft for supporting the cones, the inner cone being mounted for axial movement along the shaft, the inner cone being mounted for rotation with the shaft, and actuating means for moving the inner cone into engagement with the outer cone and for moving the inner cone in the opposite direction for disengagement, the inner cone including a pair of oppositely disposed radially movable plates, each having an outer periphery which includes a first ridged surface having ridges disposed at predetermined angles, a second fixed ridged surface on the inner wall of the outer cone having ridges disposed at predetermined angles different from the angles of the first mentioned ridges, spring means for normally urging the plates radially outward so that the tops of the ridges of the first ridged surface project beyond the remaining surface of the inner cone, on operation, the ridged surface of the outer cone being first engaged lightly by the ridges of the first engaging surfaces, the engagement building up incrementally and then as the plate is substantially depressed against the action of the spring means the ridged surface of the outer cone slows down the increasing rate of clutch engagement.

11. A cone clutch according to claim 10 wherein the ridged surface of the outer cone comprises a helically extending thread.

12. A cone clutch according to claim 10 wherein the ridged surface of the outer cone comprises a series of rings.

13. A cone clutch comprising an inner cone and an outer cone, means for advancing the inner cone into engagement with the outer cone, the inner cone including a pair of oppositely disposed radially movable plates, each having an outer periphery which includes a ridged surface and the inner cone further including a fixed ridged surface, the ridges of the plates being at an angle within the range of 55° to 65°, the ridges of the fixed ridged surface being at angles within the range of 70° to 90°, spring means for normally urging the plates radially outward so that the tops of the ridges of the first ridged surfaces project beyond the tops of the ridges of the fixed ridged surface, on operation, the outer cone being first engaged by the ridges of the engaging surfaces of the plates and then as each plate is substantially fully depressed against the action of the spring means, the outer cone being engaged by a combination of all engaging surfaces during the last stage of clutch engagement.

14. A cone clutch according to claim 13 wherein the advancing means includes a groove member at the larger end of the inner cone.

* * * * *